US007661025B2

(12) United States Patent
Banks et al.

(10) Patent No.: US 7,661,025 B2
(45) Date of Patent: Feb. 9, 2010

(54) METHOD OF ENSURING CONSISTENT CONFIGURATION BETWEEN PROCESSORS RUNNING DIFFERENT VERSIONS OF SOFTWARE

(75) Inventors: Donald Edward Banks, San Jose, CA (US); Saravanan Valapady Kanan, TamilNadu (IN); Sukhdev S. Kapur, Saratoga, CA (US); Joseph Michaelsamy Swaminathan, Union City, CA (US); Robert Arthur Land, Santa Barbara, CA (US)

(73) Assignee: Cisco Technoloy, Inc., San Jose, CA (US)

( * ) Notice: Subject to any disclaimer, the term of this patent is extended or adjusted under 35 U.S.C. 154(b) by 554 days.

(21) Appl. No.: 11/336,167

(22) Filed: Jan. 19, 2006

(65) Prior Publication Data

US 2007/0174685 A1    Jul. 26, 2007

(51) Int. Cl.
*G06F 11/00* (2006.01)

(52) U.S. Cl. ........................................ 714/12; 717/168

(58) Field of Classification Search .................. 714/12; 717/168
See application file for complete search history.

(56) References Cited

U.S. PATENT DOCUMENTS

| 5,006,992 | A  | * | 4/1991 | Skeirik .......................... 706/58 |
| 5,317,722 | A  | * | 5/1994 | Evans .......................... 717/170 |
| 5,950,230 | A  | * | 9/1999 | Islam et al. .................. 711/156 |
| 5,956,513 | A  | * | 9/1999 | McLain, Jr. ................. 717/142 |
| 6,085,333 | A  | * | 7/2000 | DeKoning et al. ............. 714/7 |
| 6,199,179 | B1 | * | 3/2001 | Kauffman et al. ............. 714/26 |
| 6,357,021 | B1 | * | 3/2002 | Kitagawa et al. ............. 714/41 |
| 6,453,424 | B1 | * | 9/2002 | Janniello .................... 713/500 |
| 6,622,302 | B1 | * | 9/2003 | Delaney et al. ............. 717/170 |
| 6,687,851 | B1 | * | 2/2004 | Somers et al. ................ 714/12 |
| 7,003,692 | B1 | * | 2/2006 | Banks et al. .................. 714/12 |
| 7,007,106 | B1 | * | 2/2006 | Flood et al. ................. 709/248 |
| 7,028,177 | B2 | * | 4/2006 | Schultz et al. ............. 713/100 |
| 7,076,645 | B2 | * | 7/2006 | Mittal et al. ................... 713/1 |
| 7,174,547 | B2 | * | 2/2007 | Wang et al. ................. 717/172 |
| 7,178,056 | B2 | * | 2/2007 | Shanbhogue .................. 714/7 |

(Continued)

OTHER PUBLICATIONS

Commsdesign.com, Purman A. Sheth, "Build High Availability into Your IP Network: Part 1", p. 25-28, Jan. 2003, Communications Systems Design, i.cmpnet.com/commsdesign/csd/2003/jan03/feat2-jan03.psd.

(Continued)

*Primary Examiner*—Robert Beausoliel
*Assistant Examiner*—Elmira Mehrmanesh
(74) *Attorney, Agent, or Firm*—Stolowitz Ford Cowger LLP

(57) ABSTRACT

A method of establishing and maintaining a consistent configuration state of a first processor, running on a first version of operating software, and a second processor, running on a second version of operating software, is described. The method involves determining a current configuration state of the first processor, where the configuration state comprises a list of configuration commands. The method also involves performing a syntax check for each command in the current configuration, using the second processor and the second version of operating software, with the syntax check resulting in a pass or a fail result. For every command which results in a fail result, an entry is added to a mismatched configuration list (MCL). Embodiments of this invention can be utilized to keep the configurations consistent during an upgrade or downgrade of the operating software.

15 Claims, 7 Drawing Sheets

U.S. PATENT DOCUMENTS

| | | | |
|---|---|---|---|
| 7,266,731 B2 * | 9/2007 | Ali-Santosa et al. | 714/42 |
| 7,272,815 B1 * | 9/2007 | Eldridge et al. | 717/101 |
| 7,356,733 B2 * | 4/2008 | Michaelis et al. | 714/12 |
| 7,509,400 B1 * | 3/2009 | Tanner et al. | 709/220 |
| 2005/0114846 A1 * | 5/2005 | Banks et al. | 717/136 |
| 2006/0031427 A1 * | 2/2006 | Jain et al. | 709/220 |

OTHER PUBLICATIONS

Intel.com Manasi Deval, An Architecturefor Highly Available Distributed Control Plane Protocols, pp. 1-8, 2004, Intel Corporation, www.intel.com/technology/magazine/computing/it08042.pdf.

* cited by examiner

Flowchart 200

Flowchart 300

Flowchart 400

Flowchart 500

Flowchart 600

Flowchart 700

METHOD OF ENSURING CONSISTENT CONFIGURATION BETWEEN PROCESSORS RUNNING DIFFERENT VERSIONS OF SOFTWARE

BACKGROUND

1. Field of the Invention

Embodiments of the present invention relate to methods and systems for ensuring consistent configurations across multiple redundant processors in a stateful system.

2. Related Art

In order to provide greater reliability, many critical computing devices are equipped with multiple redundant processors. In such a system, processors can be classified as Active and Standby. The Active processor has control of the system. A Standby processor takes over if necessary, e.g., if the Active processor should fail. In order for such a switchover to be effected with minimal disruption of services, the Active and Standby processor(s) need to remain synchronized, particularly with respect to the configuration instructions being executed at a given time.

In some situations, the Active and Standby processors can be running different versions of the same operating system. This can occur, for example, during a software upgrade (or downgrade) situation in which the customer wants to change the version of the software that is running without any interruption to service. In order for the system to remain synchronized, both the Active and Standby processors need to be capable of understanding and responding to the same commands.

The above-described scenario applies to any system with redundant processors, where at least one hot Standby processor is kept ready to assume control from the Active processor, if needed. One such system is a network router with redundant processors. Routers with redundant processors are often used in environments where a lapse in connectivity caused by a failure in hardware or software would cause a loss of service.

The operating system that controls the operation of these routers is updated fairly frequently; as part of that update process, the command set understood by the router may be modified, with commands added, removed, or modified. These commands are used to configure the operation and behavior of the router, and the entities that utilize such a router will often have invested time and effort into establishing scripts to configure their router.

During a software upgrade, the router will end up running two different versions of the operating system on the Active and Standby processors. If the different versions do not have precisely the same command set, a command executed on the Active processor could succeed, while the same command executed on the Standby processor would fail. Alternatively, the command could produce different results in the differing versions of the router OS. This would lead to a configuration mismatch, as the Active and Standby processors would no longer be in sync with each other. In such a case, the Standby processor would fail to take control of the router without interrupting service, if called upon to do so. The Standby process could fail altogether when the switchover occurs.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
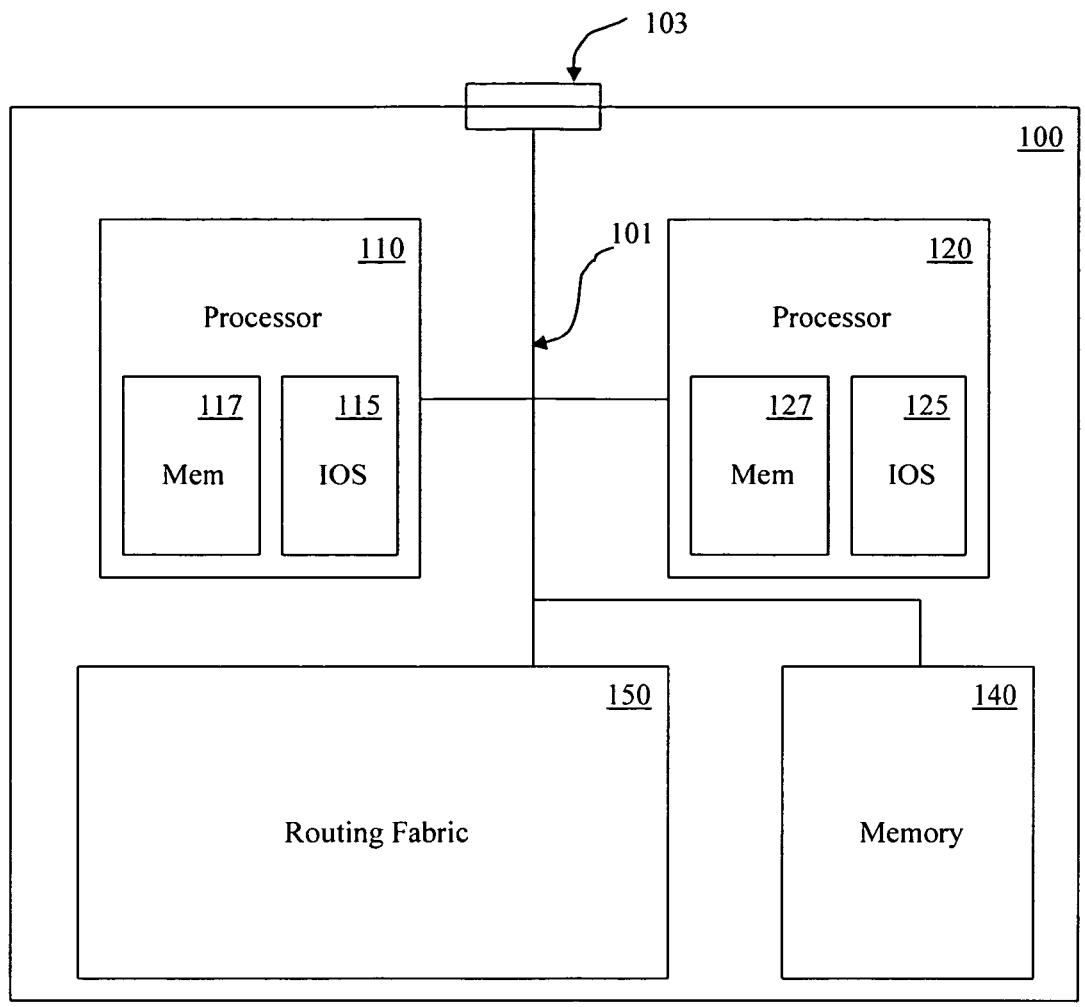
FIG. 1 depicts an exemplary routing system, upon which embodiments of the present invention can be practiced.

Methods and systems for ensuring a consistent configuration between processors running different software versions will be described. Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 2) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Routing System

With reference now to FIG. 1, an exemplary routing system is depicted, upon which embodiments of the present invention can be practiced. Router 100 is shown as having a processor 110, executing an image of the Internetworking Operating System (IOS) 115, and having an associated memory 117. Router 100 includes a second processor 120, executing IOS 125, and having an associated memory 127. Router 100 also includes routing fabric 150. In some embodiments, router 100 also includes a shared memory unit 140. A bus 101 interconnects the components of router 100, and allows processor 110 and processor 120 to communicate with each other. A console port 103 is shown; in this embodiment, commands and instructions for router 100 are passed through console port 103.

Embodiments of the present invention will be described in terms of the operation of router 100. While router 100 is depicted as having certain features, it is understood that embodiments of the present invention can be implemented on a router that omits listed features, or that includes additional features. Further, it is understood that other embodiments can be practiced on many different computing platforms having redundant processors, and are not limited to network routers.

Synchronization Across Redundant Processors

In some embodiments, router 100 is controlled by the Internetworking Operating System (IOS), developed by Cisco Systems, Inc. The IOS command line interface (CLI) provides commands, understood by IOS, for controlling and configuring router 100. The IOS CLI has a long revision history, with many supported commands, most with associated parameters or variables. In order to streamline the configuration of router 100, a user can establish configuration scripts, which written using IOS CLI commands and are executed on router 100 to quickly configure multiple settings. A user can also manually input IOS CLI commands one at a time by connecting to router 100, e.g. through console port 103, and entering IOS CLI commands at a command line prompt.

Often when an IOS revision occurs, the IOS CLI has been modified. New commands may have been added, or old commands deprecated, or the acceptable parameters for existing commands modified. Any of these modifications can affect the operation of configuration scripts written for previous versions of IOS. For example, if a configuration script calls for an IOS CLI command that does not exist in the newest version of IOS, the script will not produce the same results under the newest version as were achieved under an older version.

In some embodiments, router 100 supports stateful switchover (SSO). If an Active processor, e.g., processor 110, fails, SSO allows for a hot-standby processor, e.g., processor 120, to take control of router 100 while maintaining network connectivity, without dropping any established sessions. With SSO, both Active and Standby route processors maintain Layer 2 data-link connectivity information by checkpointing the minimal data required to maintain layer 2 protocol state, e.g., ATM, Frame Relay, and Ethernet connections, from the Active route processor to the Standby processor. Maintaining the physical connections and session state is imperative in order to ensure no session loss occurs during a switchover. The routing Forwarding Information Base is also maintained as an up-to-date copy in the Standby processor so that forwarding can continue and be quickly reestablished after a switchover. This enables the system to minimize CPU utilization at switchover time and maintains the Standby processor in hot standby state. If the processor 110 fails, SSO switches control to processor 120, now the Active processor, and attempts to reboot the failed processor 110. If rebooting is successful, processor 110 becomes the Standby processor. If processor 110 cannot be successfully rebooted, it can be removed from router 100 to be repaired or replaced, without disrupting processor 120 and without impeding operation of router 100.

In some embodiments, router 100 also support in-service software upgrades (ISSU). Some implementations of ISSU allow router 100 to receive upgrades to the IOS, without interrupting service. When a new version of IOS is available, it can be loaded on one of the redundant processors, while another processor maintains control of router 100. For example, in an embodiment where processor 110 is currently the Active processor, and processor 120 is the Standby processor, a new release of IOS could be loaded as IOS 125 without interrupting the operation of processor 110, which is operating under IOS 115. When processor 120 is brought up under the new version of IOS, active control can be switched to processor 120, and processor 110 can be brought down while the new version of IOS is loaded into IOS 115. By combining ISSU and SSO, upgrading the operating system in router 100 can be accomplished with no interruption to service.

In some embodiments, configuration synchronization (Config Sync) is used to ensure that the configuration states of processor 110 and processor 120 remain consistent. Config Sync is particularly important with embodiments of router 100 that implement both SSO and ISSU, as a mismatch between commands, and thereby potentially the states that result from execution of those commands, would inhibit or prevent the smooth transition between the Active and Standby processors. Config Sync detects commands that are not supported by both the Active and Standby processors. If the command has not already been executed on the Active processor, Config Sync prevents the command from executing. If the command has already been executed on the Active processor, Config Sync attempts to bring router 100 back into a safe state, until the issue can be resolved. In cases where user intervention is required, Config Sync will trigger a user notification, to inform the user of the existence and nature of any problems which require user action to correct.

Bulk Synchronization

Synchronization of the Active and Standby processors needs to occur in several sets of circumstances. First, when a processor joins the configuration, e.g., when a processor is initially powered up, or reboots and rejoins, the complete list of commands for the Active processor is run on the Standby processor. This process can be referred to as configuration bulk synchronization (config bulk sync). Second, after the Standby processor has joined the configuration and completed the config bulk sync process, any valid command, e.g., any command that can be understood by the versions of software running on each processor, entered after the start of the bulk sync, and which was not part of the bulk sync, for the Active processor is run on the Standby processor as well. This process can be referred to as line-by-line (LBL) synchronization.

Figure 2:
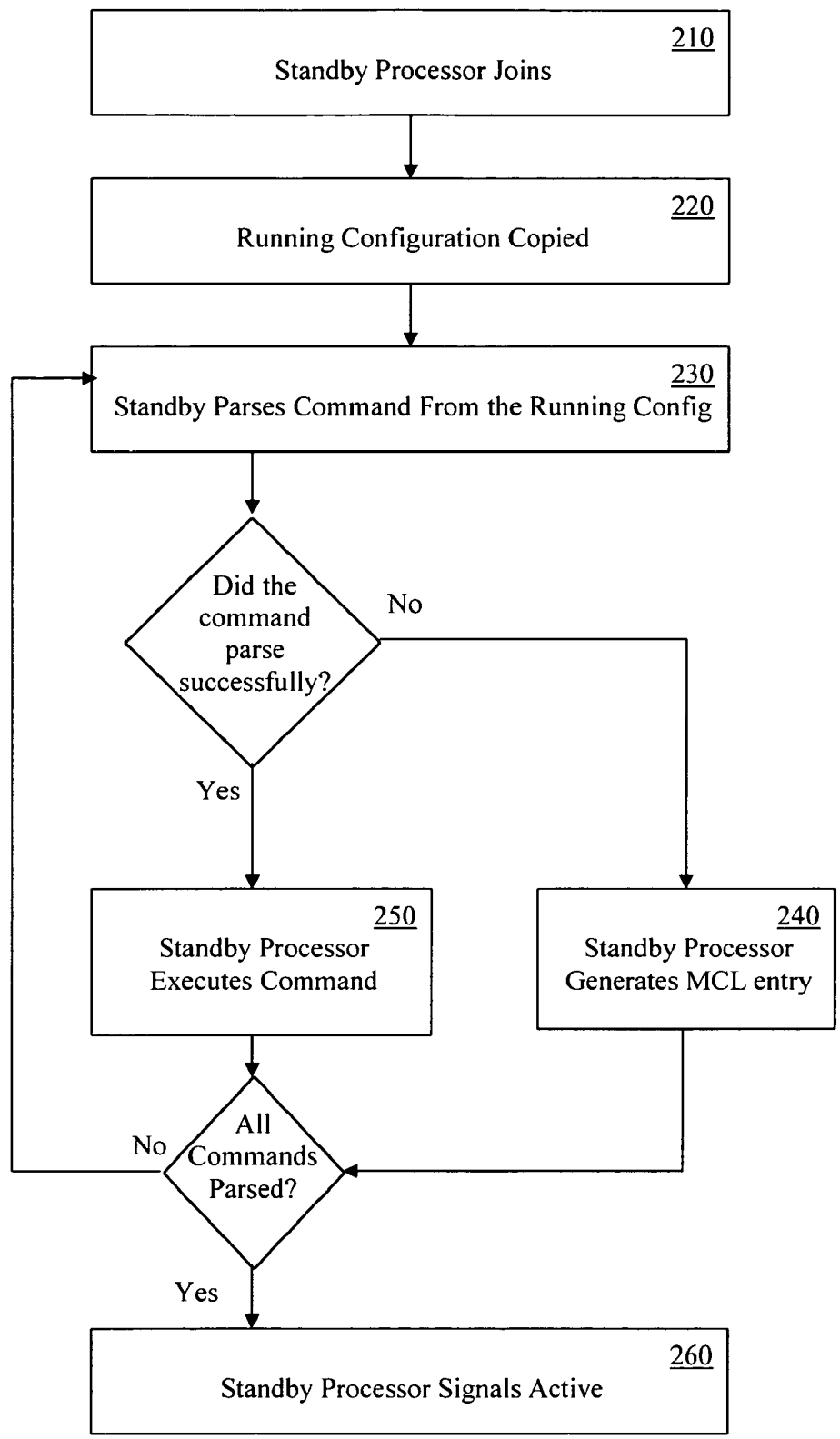
FIG. 2 depicts a flowchart depicting a method for performing a bulk synchronization process, in accordance with one embodiment of the present invention.

With reference now to FIG. 2, a flowchart depicting a method for performing a bulk synchronization process is depicted, in accordance with one embodiment of the present invention. Although specific steps are disclosed in flowchart 200, such steps are exemplary. That is, embodiments of the present invention are well suited to performing various other (additional) steps or variations of the steps recited in flowchart 200. It is appreciated that the steps in flowchart 200 may be performed in an order different than presented, and that not all of the steps in flowchart 200 may be performed.

With reference now to step 210, the Standby processor joins router 100. In some embodiments, the Standby processor, here processor 120, has just been powered up, or completed a reboot cycle. In other embodiments, processor 120 has just been added to router 100, e.g., as a replacement for a faulty processor, or as an upgrade to an existing system. For the purposes of this method, it is understood that the Active and Standby processors are running different versions of IOS, e.g., IOS 115 is a different version than IOS 125. In some embodiments, IOS 115 is an older release than IOS 125; in other embodiments, the reverse is true.

With reference now to step 220 and FIG. 1, in some embodiments, the Active processor copies the running-configuration. For example, if processor 110 is the Active processor, the running-configuration, e.g., all of the commands that have been executed on processor 110 since it began operation, are copied out to a file, e.g., a file called rcsf. Rcsf needs to be write-accessible to the Active processor, processor 110, and read-accessible to the Standby processor, here processor 120. In some embodiment, rcsf is written to a RAM based file system in the Standby processor's associated memory, here memory 127. In other embodiments, rcsf is written to a separate memory unit within router 100, e.g., memory 140. In other embodiments, rcsf is written to other data storage locations.

In some embodiments, the running configuration file is generated by using a configuration state retrieval operation, e.g., the IOS CLI process NVGEN. When invoked, NVGEN queries each system component and each instance of interface or other configuration objects. The running configuration file is constructed from the results of these queries. Other embodiments use other methods of generating the current running configuration file.

In some embodiments, processor 110 writes the running configuration to rcsf using a format that allows for identifying modes and submodes using markers, such as the format presented below in Table 1. In this embodiment, lines beginning with a "!" are treated as comments by IOS.

TABLE 1

```
...
clock timezone PST 0
no aaa new-model
ip rubnet-zero
!
!
```

TABLE 1-continued

```
archive
!<mode> "archive"
log config
! <submode> "archive log config"
logging enable
! </submode> "archive log config"
!
...
```

With reference now to step 230 and FIG. 1, the operating system on the Standby processor parses a command from the running configuration file generated by the Active processor. Here, processor 120 reads in a command from rcsf, the running configuration file, and checks the syntax of the command against the commands understood by IOS 125. In some embodiments, where file rcsf is formatted to delimit submodes, as illustrated in Table 1, if a submode is initiated with a command that fails to parse, all commands associated with that submode are skipped. For example, if processor 120 cannot parse "log config," which initiates a submode of operation, processor 120 does not attempt to parse any lines between the tag showing the start of the submode, here "!<submode>," and the tag ending the submode, "!</submode>."

With reference now to step 240 and FIG. 1, if a command in the running configuration fails to parse, the operating system on the Standby processor generates an entry on the Mismatched Command List (MCL). The MCL is a list of commands from rcsf that failed to parse properly on the Standby processor. The MCL is stored in a location that must be writable by processor 120, the Standby processor, and readable by processor 110, the Active processor. In some embodiments, the MCL is placed in a RAM based file system in the memory associated with the Active processor, e.g., memory 117. In other embodiments, the MCL is written to another location, e.g., memory 140. In some embodiments, if all commands parse without error, no MCL is generated. Table 2, below, shows an exemplary block of an MCL taken from Table 1, above, where IOS 125 on processor 120 was unable to parse the submode. In the depicted embodiment, commands from rcsf that failed to parse are further indicated by prefixing each line with a minus sign, "−."

TABLE 2

```
archive
!<mode> "archive"
    - log config
! <submode> "archive log config"
    - logging enable
! </submode> "archive log config"
!
...
```

With reference now to step 250 and FIG. 1, in some embodiments, if the command parsed in step 230 passes the syntax check, the Standby processor executes the command. In some embodiments, the process then returns to step 230, and the next command in the running configuration file is handled. This loop continues, until every command in the running configuration file has been syntax-checked on the Standby processor. In other embodiments, the entire running configuration file is parsed and syntax-checked, before any commands are executed on the Standby processor.

With reference now to step 260 and FIG. 1, in some embodiments, Config Sync on the Standby processor signals Config Sync on the Active processor, sending a message to inform the Active processor that the MCL has been generated, and whether the file is empty. If MCL is empty, every line in rcsf parsed successfully, and the ISSU framework can bring the Standby processor up in hot-standby state. If MCL is not empty, then a configuration mismatch condition exists, which must be addressed. One approach to mismatch resolution is addressed below, with reference to FIG. 4.

Line-by-Line Synchronization

Figure 3:
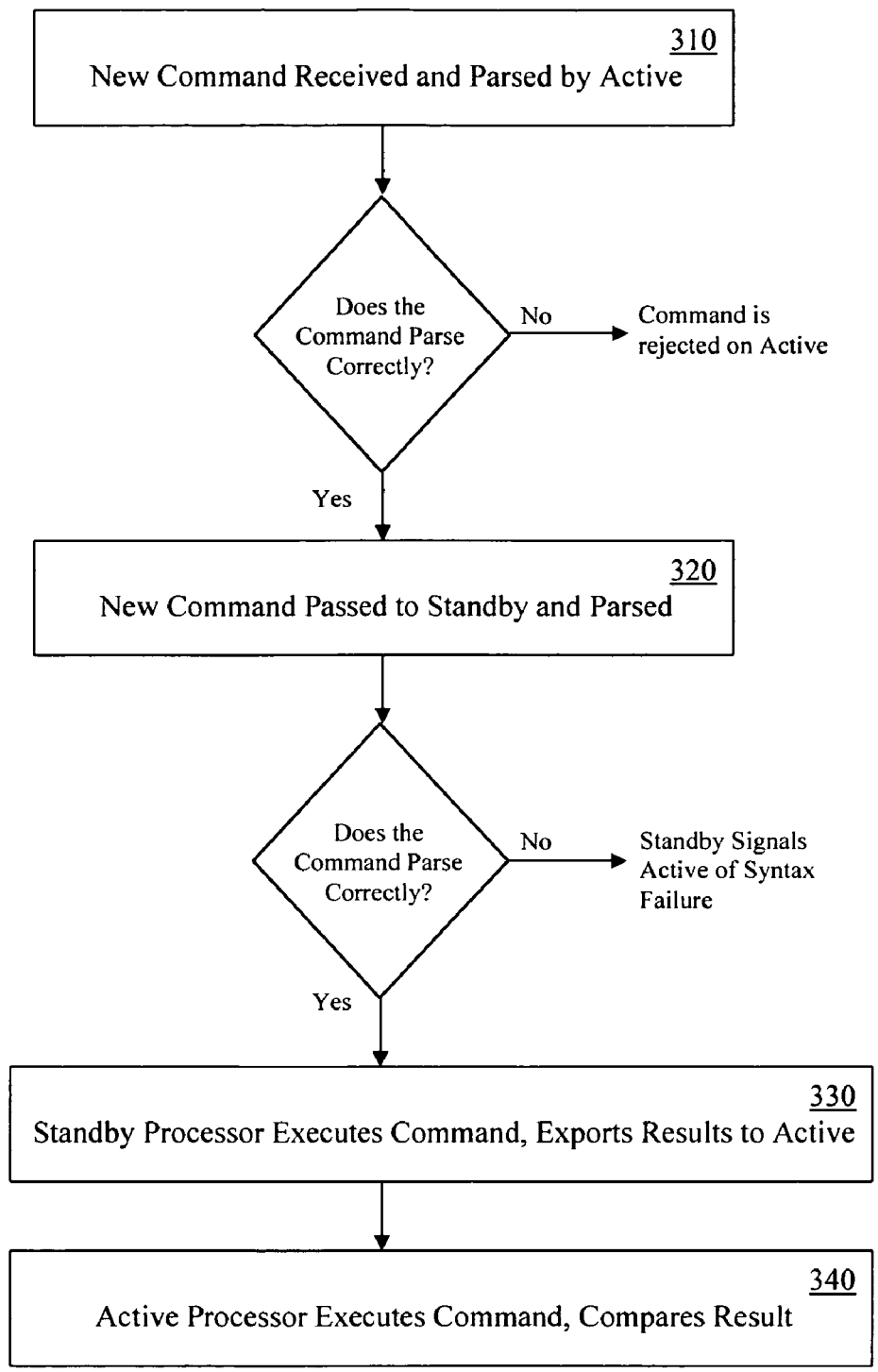
FIG. 3 depicts a flowchart depicting a method for performing a line-by-line synchronization (LBL) process, in accordance with one embodiment of the present invention.

With reference now to FIG. 3, a flowchart depicting a method for performing a line-by-line synchronization (LBL) process is depicted, in accordance with one embodiment of the present invention. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

Line-by-line synchronization (LBL) is performed after a successful bulk sync, when the Active and Standby processors are synchronized, and the Standby processor is in hot-standby mode. One purpose for LBL is to ensure that the Active and Standby processors remain fully synchronized. As such, in some embodiments, the LBL process serves to prevent commands from executing, if those commands would result in a configuration mismatch.

With reference now to step 310 and FIG. 1, in some embodiments, a new command is received by router 100, and parsed by the Active processor. In many embodiments, the new command would enter via console port 103, and be directed to the Active processor, here processor 110. The Active processor parses the new command, according to some embodiments. If the new command has correct syntax for IOS 115 running on processor 110, the method continues. If the syntax is incorrect, in most embodiments an error message is displayed, or logged, such that a notification of the failure is available. It is important to note that the new command has not yet been executed on the Active processor, nor had any effect on the running configuration of the Active processor.

With reference now to step 320 and FIG. 1, the new command is passed to the Standby processor, here processor 120, and parsed. In some implementations, before the new command can be passed to processor 120, the NVGEN process detailed above must be performed on the command. In other embodiments, the new command can be forwarded without any translation or modification. The Standby processor checks the syntax of the new command. Processor 120, which is running IOS 125, needs to be capable of executing the new command. After the syntax check, the Standby processor 120, sends a message back to the Active processor, processor 110, indicating whether the command is syntactically acceptable or not (on the Standby). If it was the method continues to step 330. If it was not, then the command is rejected, and the Active is notified. In some embodiments, the MCL is utilized, and a command that fails a syntax check on the Standby processor is therefore placed on the MCL.

With reference now to step 330 and FIG. 1, the new command is executed on the Standby processor. Processor 120 executes the new command. If execution is successful, the result is passed to the Active processor, processor 110, and the method continues to step 340. Having established, e.g., by the method of step 320, that the new command has correct syntax for the Standby processor, it is also necessary to determine whether the command will execute correctly, before allowing the Active processor to execute the new command.

With reference now to step 340 and FIG. 1, the new command is executed on the Active processor. Processor 110, the Active processor in this example, executes the new command. The result of execution is then checked against the result from the Standby process, to verify that the states on both Standby and Active remain consistent.

Exceptions—MIL and DCSL

Under certain circumstances, a user may wish to override a configuration mismatch during bulk synchronization, and ignore an entry on the MCL. Additionally, some commands should not be executed on the Standby processor, or will never execute properly on the Standby processor. Further, some commands, once executed on the Active processor, can never be removed from the running configuration. Embodiments of the present invention allow for these and similar issues through the use of two additional lists: the Mismatched Ignore List (MIL) and the Don't Care to Sync List (DCSL).

The Mismatched Ignore List (MIL), in some embodiments, is used to allow the bulk sync process to ignore commands which fail syntax check during bulk synchronization, e.g., step 240 of flowchart 200, described above. The MIL is used to allow the bulk synchronization process to continue, in spite of a failed syntax check. Many such commands are of the type that, once added to a configuration, cannot be removed, e.g., "control-plane" and "gatekeeper." In some embodiments, such commands could remain in the MCL after bulk sync, with no available method for resolving the mismatch configuration problem.

The Don't Care to Sync List, in some embodiments, is provided by a user, e.g., as part of an IOS upgrade or downgrade process. In other embodiments, the DCSL is implicit in the IOS CLI commands themselves, and need not be maintained as a discrete list. In such embodiments, a command which should not be synched to the Standby processor will have a parameter which can be checked, e.g., PRC_HA_DONT_SYNC. In most embodiments, the DCSL is populated with configuration commands that should only be performed on the Active processor. Many such commands are related to, e.g., platform specific hardware configuration commands for hardware that is shared between the Active and Standby processors, but is only accessible from the Active processor.

Figure 4:
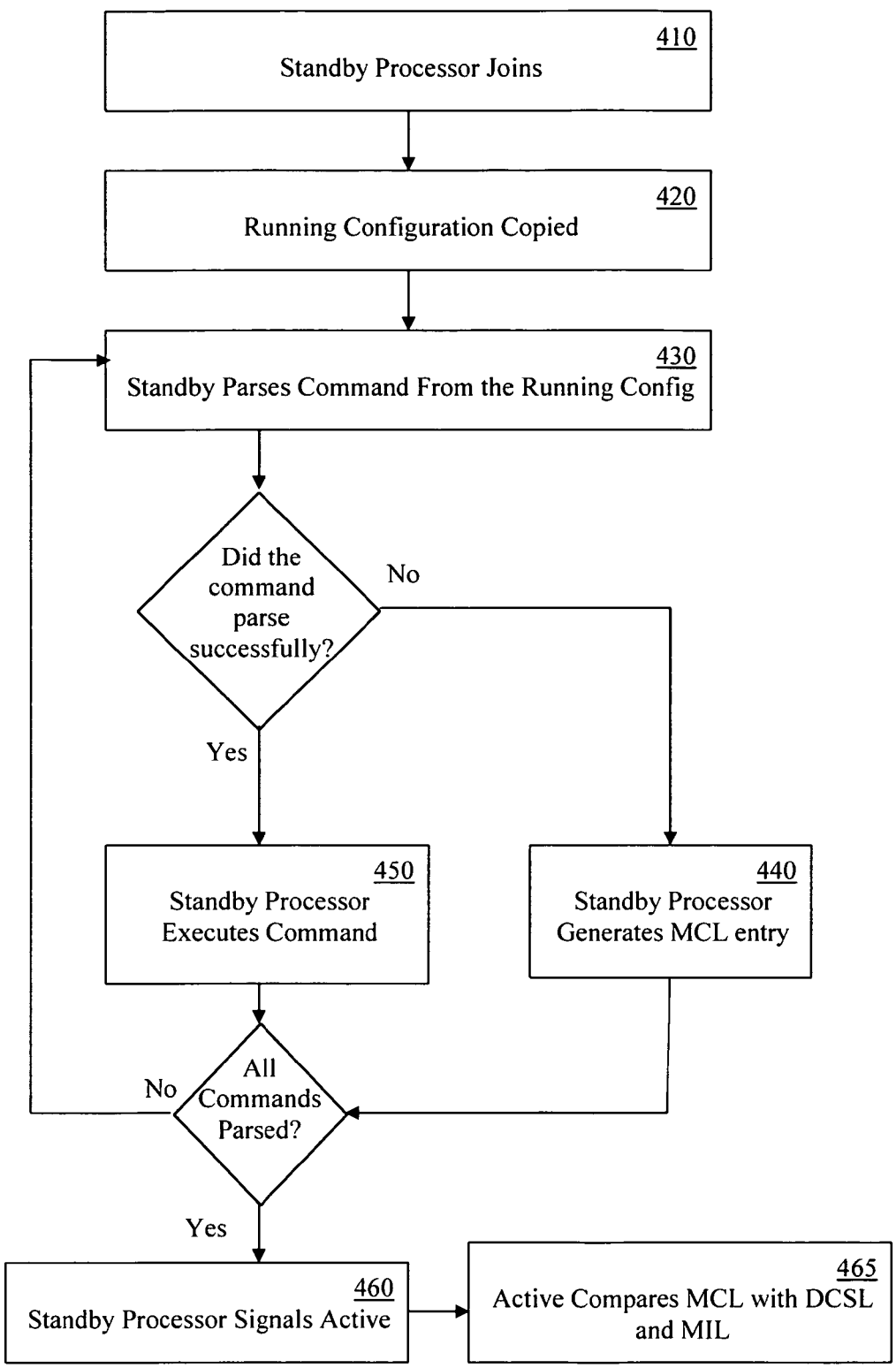
FIG. 4 depicts a flowchart depicting a method of bulk synchronization with error-handling, in accordance with one embodiment of the present invention.

With reference now to FIG. 4, a flowchart depicting a method of bulk synchronization with error-handling is provided, in accordance with one embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

In most embodiments, the method described in flowchart 400 follows the operations described in flowchart 200 for bulk synchronization. With the exception of the addition of step 465, the operation of the method shown in flowchart 400 is similar to that of the method depicted in flowchart 200.

With reference now to step 465, the Active processor compares the MCL with the MIL and the DCSL. If the MCL is a subset of the MIL and the DCSL, e.g., if every command which appears on the MCL appears on either the MIL or the DCSL as well, the Standby processor will not be prevented from starting in hot-standby state.

Figure 5:
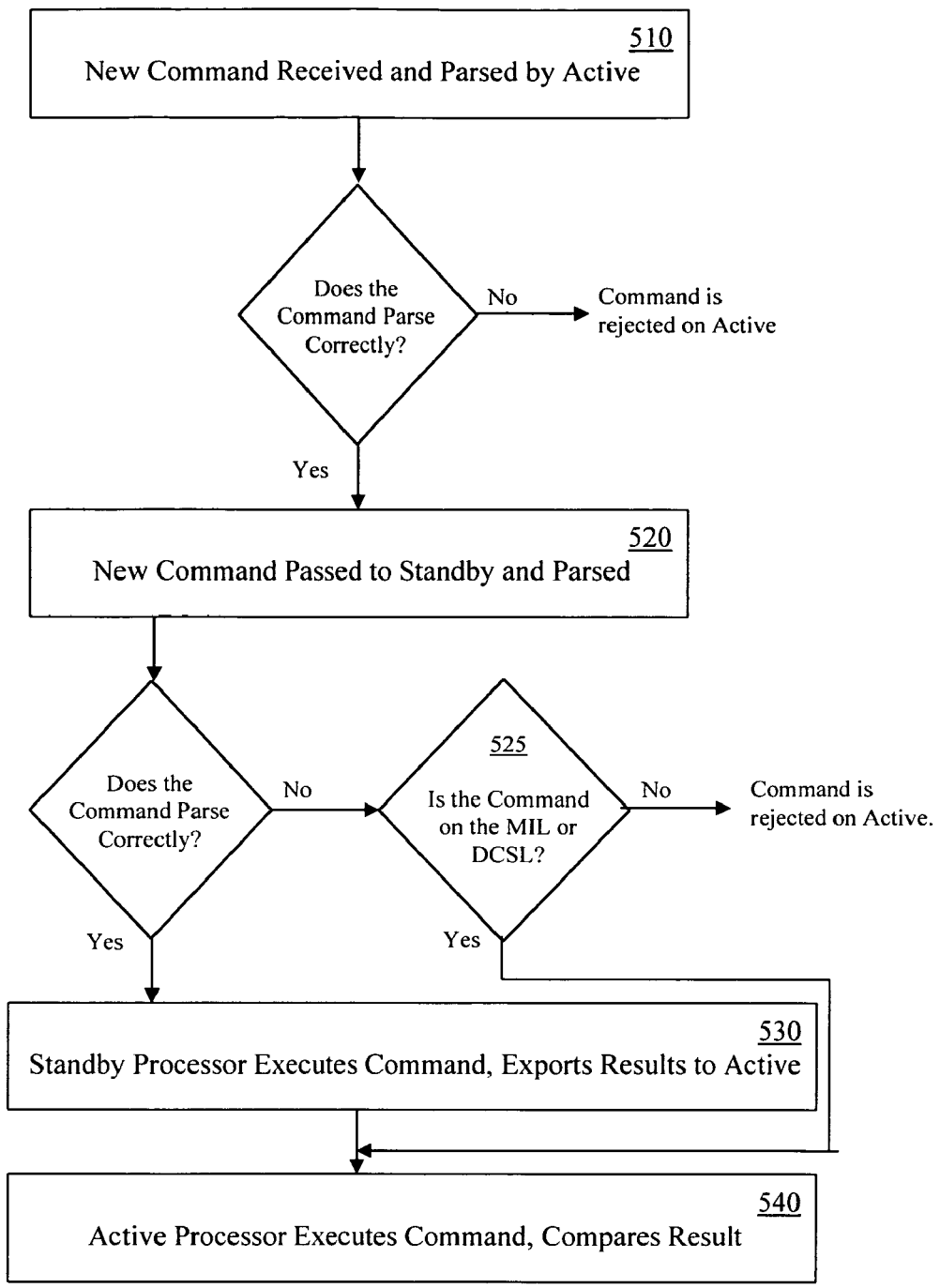
FIG. 5 depicts a flowchart depicting a method of line-by-line synchronization with error handling, in accordance with one embodiment of the present invention.

With reference now to FIG. 5, a flowchart depicting a method of line-by-line (LBL) synchronization with error handling is provided, in accordance with one embodiment of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

In most embodiments, the method described in flowchart 500 follows the operations described with reference to flowchart 300, above. With the exception of step 525, the operation of the method shown in flowchart 500 is similar to that of flowchart 300.

With reference now to step 525, if the new command has failed the syntax check on the Standby processor, it is included in the MCL sent back to the Active processor by the Standby. When the Active processor receives the MCL, it is checked against the MIL and DCSL. Commands which appear in the MCL and also in either the MIL or DCSL will not be rejected by the Active processor, and will be allowed to execute on the Active; such commands are not executed by the Standby. If the command in the MCL does not appear on either the MIL or DCSL, it is rejected on the Active processor, as described above.

In-Service Software Upgrade

Figure 6:
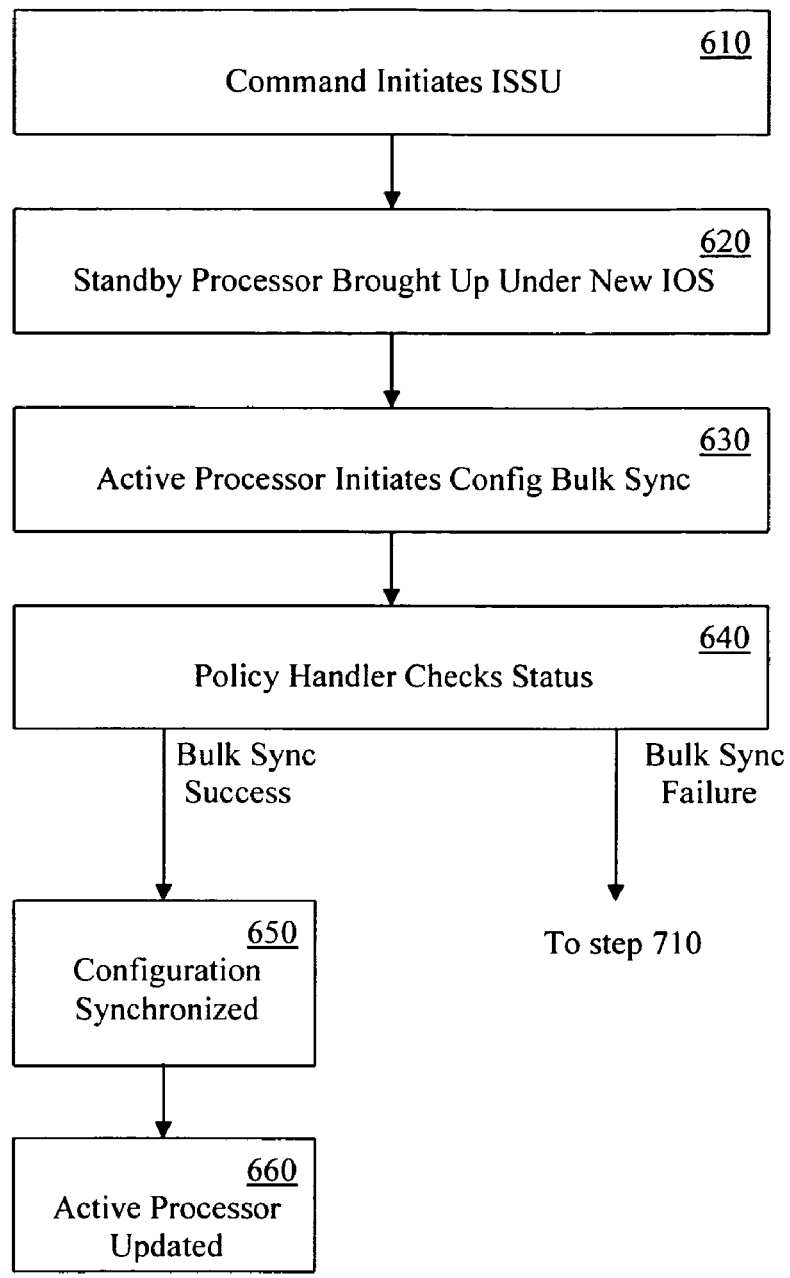
FIG. 6 depicts a method of checking configuration synchronization during an in-service software upgrade, in accordance with one embodiment of the present invention.

With reference now to FIG. 6, a method of maintaining a consistent configuration between the Active and the Standby during an in-service software upgrade is depicted, in accordance with one embodiment of the present invention. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 610 and FIG. 1, router 100 receives a command initiating ISSU with a new version of IOS, version Y. For exemplary purposes, it is assumed that processor 110 is currently the Active processor, while processor 120 is the Standby processor, and as of this step IOS 115 and IOS 125 are the same version, version X. At the end of this step, the MCL is empty.

With reference now to step 620 and FIG. 1, the Standby processor, processor 120, is brought up with the new version of IOS, version Y. When processor 120 is ready, it announces its status to the Active processor, processor 110. At the end of this step, processor 110 is the Active processor and running IOS version X, processor 120 is the Standby processor and running IOS version Y, and Config Bulk Sync has not yet run.

With reference now to step 630 and FIG. 1, Config Sync on the Active processor initiates a bulk sync process. In some embodiments, this bulk sync process utilizes the method described above, with regard to FIG. 2. In other embodiments, the method described above with regard to FIG. 4 is utilized. In other embodiments, another method for achieving bulk synchronization is used. At the end of this step, processor 110 is the Active processor and running IOS version X, and processor 120 is the Standby processor and running IOS version Y. If a command fails a syntax check on the Standby processor, the bulk sync process will not be successful, and the MCL will no longer be empty.

With reference now to step 640 and FIG. 1, the policy handler for the Active processor determines the status of the ISSU. If the MCL is empty, and bulk sync was successful, the configuration used for version X will work for version Y. In some embodiments, where the bulk sync process of step 630 does not provide for error handling via the MIL and/or the DCSL, this step includes the policy handler on the Active processor filtering the MCL through the DCSL, and/or comparing the MCL against the MIL. If the MCL is not empty, or not all of the remaining commands can be ignored, a configuration mismatch has occurred, which should be addressed before the ISSU continues. This latter case is discussed more fully below, with reference to FIG. 7.

With reference now to step 650 and FIG. 1, configuration synchronization is complete. At the end of this step, processor 110 is the Active processor and running IOS version X, processor 120 is the Standby processor and running IOS version Y, and processor 120 is synchronized with processor 110.

With reference now to step 660 and FIG. 1, the Active processor is updated with the new version of IOS. After the Standby processor has reached hot standby state, a stateful switchover from processor 110 to processor 120 is performed, in order to make IOS on processor 120 the Active providing service. Once processor 120 is the Active processor, in some embodiments, processor 110 is rebooted and brought up as the Standby processor, still running IOS version X. Once the user is satisfied with IOS version Y, he can "commit" version Y. Processor 110 is then reloaded and rebooted, and brought up as the Standby processor, but now running IOS version Y. A Config bulk sync performed to bring processor 110 into sync with the Active processor, processor 120. At the end of this step, processor 120 is the Active processor and running IOS version Y, processor 110 is the Standby processor and running IOS version Y, and processor 110 is synchronized with processor 120 and the upgrade has been completed without a loss of service.

Mismatch Recovery during ISSU

Figure 7:
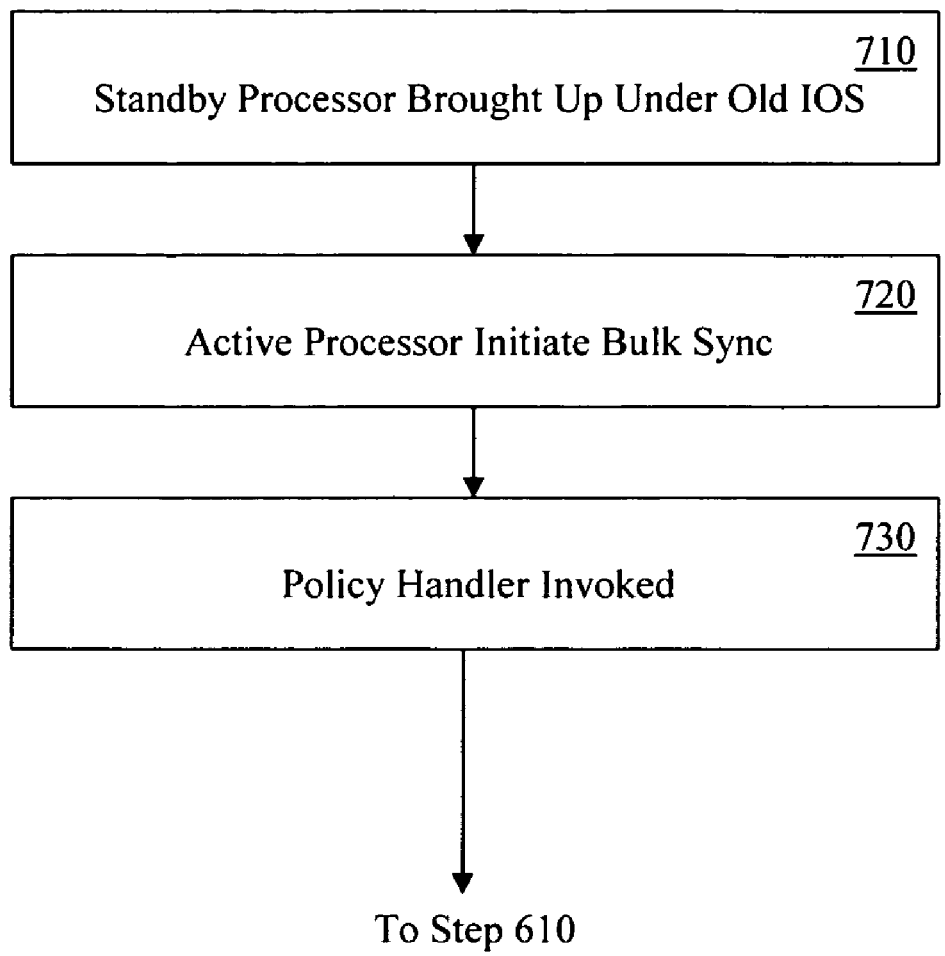
FIG. 7 depicts a method of mismatch recovery during an in-service software upgrade, in accordance with one embodiment of the present invention.

With reference now to FIG. 7, a method of mismatch recovery during an in-service software upgrade is depicted, in accordance with one embodiment of the present invention. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

The method described in flowchart 700, in some embodiments, is performed when a configuration mismatch is detected during ISSU, e.g., following step 640, discussed above. For the purposes of discussion of this method, it is assumed that processor 110 is the Active processor and running IOS version X, processor 120 is the Standby processor and running IOS version Y, processor 110 and processor 120 are not synchronized. The MCL is not empty, and the entries in the MCL do not match the MIL or the DCSL, or this method would not be triggered.

With reference now to step 710 and FIG. 1, the Standby processor, here processor 120, currently running version Y is brought up with IOS version X, the same IOS version the Active processor is executing by forcing a reload and reboot of the older image. When IOS 125 on processor 120 is ready, it announces its status to the Active processor, processor 110. At the end of this step, processor 110 is the Active processor and running IOS version X, processor 120 is the Standby processor and running IOS version X, and processor 110 and processor 120 are not yet synchronized. The MCL is still populated with commands that execute under IOS version X, but are not understood or executable by version Y.

With reference now to step 720 and FIG. 1, Config Sync on the Active processor initiates a config bulk sync to IOS on the Standby processor. Unless an unrelated problem occurs, this config bulk sync process will succeed, as both the Active and the Standby processors are running the same IOS version, version X, and no errors should result. At the end of this step, processor 110 is the Active processor and running IOS version X, processor 120 is the Standby processor and running IOS version X, and processor 110 and processor 120 are synchronized. The MCL is still populated with commands that execute under IOS version X, but are not understood or executable by version Y.

With reference now to step 730 and FIG. 1, the policy handler for the Active processor is invoked. In some embodiments, the verification handler allows a user to remove the commands in the MCL from the running config of the Active processor. In others, the verification handler allows the user to choose to ignore some or all of the commands that appear in the MCL, e.g., by adding the commands to the MIL. Some embodiments provide for a combination of these approaches. The process detailed in flowchart 600 then begins again at step 610, with a command to router 100 to load IOS version Y.

At the end of step 730, either the user has addressed all of the commands in the MCL, or the user has chosen not to. In the former case, now that the commands that made up the MCL have been removed or properly ignored, ISSU with version Y on the Standby processor should succeed. In the latter case, if the user attempts to upgrade to version Y on the Standby processor, ISSU will fail again, as the same MCL will be created by the Config bulk sync process.

Embodiments of the present invention are thus described. While the present invention has been described in particular embodiments, it should be appreciated that the present invention should not be construed as limited by such embodiments, but rather construed according to the following claims.

What is claimed is:

1. A method, comprising:
processing network traffic for logical connections established between network devices using a first processor;
maintaining physical layer connectivity information for the established logical connections using a second processor;
receiving a request to perform an asymmetric in-service software upgrade, wherein the asymmetric in-service software upgrade request is configured to, if accepted, cause the second processor to maintain the physical layer connectivity information for the established logical connections while running a first internetwork operating system that is different than a second internetwork operating system concurrently used by the first processor;
prior to performing the requested asymmetric in-service software upgrade, determining a command set for said second internetwork operating system, wherein said command set comprises a listing of a plurality of configuration commands;
for each of said plurality of configuration commands, performing a syntax check on said second processor and said first internetwork operating system, said syntax check identifying internetwork operating system commands that are present in the command set of the second internetwork operating system but absent from a command set of the first internetwork operating system;
generating a Mismatched Command List (MCL) having entries for each of the identified internetwork operating system commands; and
performing the requested asymmetric in-service software upgrade according to an analysis of the MCL, wherein said first processor and said second processor are configured to operate in a Stateful SwitchOver mode of operation, wherein said first processor is configured to be an Active processor and said second processor is configured to be a Standby processor, and wherein if said MCL is not empty, said Standby processor is prevented from reaching a hot-standby state.

2. The method of claim 1, further comprising:
if there are no identified internetwork operating system commands, performing the requested asymmetric in-service software upgrade.

3. The method of claim 2, further comprising:
conducting a stateful switchover between the processors so that the first internetwork operating system provides an active service and the second internetwork operating system provides a standby service.

4. The method of claim 3, further comprising:
performing an additional in-service software upgrade after conducting the stateful switchover, wherein the additional in-service software upgrade results in both processors operating according to the first internetwork operating system.

5. The method of claim 4, further comprising:
creating a "Don't Care to Sync List" (DCSL), comprising a listing of a plurality of configuration commands that should not be executed on said second processor;
checking each identified internetwork operating system command against said DCSL; and
if every identified internetwork operating system command appears on said DCSL, performing the requested asymmetric in-service software upgrade.

6. The method of claim 1, further comprising:
creating a Mismatch Ignore List (MIL) comprising a listing of a plurality of configuration commands which can be ignored during synchronization;
checking each identified internetwork operating system command against said MIL; and
if every identified internetwork operating system command appears on said MIL, performing the requested asymmetric in-service software upgrade.

7. A multiprocessor computing device, comprising:
a bus;
a first processor, coupled to said bus;
a first operating system, executing on said first processor;
a second processor, coupled to said bus, the second processor for maintaining physical layer connectivity information for network sessions processed by the first processor so that the multiprocessor computing device can conduct a stateful switchover between the processors without disrupting the network sessions; and
a port coupled to said bus, for receiving a second operating system;
wherein said multiprocessor computing device executes said second operating system on said second processor, said first processor determines a current configuration state of said first processor, said second processor performs a syntax check of each of a plurality of configuration commands associated with said current configuration state, and for each of said plurality of configuration commands that fails said syntax check, said second processor creates an entry on a Mismatched Command List (MCL); and wherein said first processor and said second processor are configured to operate in a Stateful SwitchOver mode of operation, wherein said first processor is configured to be an Active processor and said second processor is configured to be a Standby processor, and wherein if said MCL is not empty, said Standby processor is prevented from reaching a hot-standby state.

8. The multiprocessor computing device of claim 7, wherein said entry on said MCL is checked against a list of mismatched configuration commands to be ignored, and further wherein if every entry on said MCL appears on said list of mismatched configuration commands to be ignored, allowing said second processor to reach said hot-standby state and said first processor and said second processor to operate in said Stateful SwitchOver mode.

9. A computer-usable medium encoded with computer-readable program code that, if executed, results in:
receiving a request for an asymmetric in-service software upgrade, wherein the asymmetric in-service software upgrade request is configured to, if accepted, result in an active first processor and a second processor operating according to different internetwork operating systems, wherein each internetwork operating system is configured to control a router;
prior to completing the requested asymmetric in-service software upgrade, determining a current configuration state of said first processor, wherein said current configuration state comprises a listing of a plurality of configuration commands that together form a command set of the first processor's internetwork operating system;
for each of said plurality of configuration commands, performing a syntax check on said second processor and a new internetwork operating system for the second processor, said syntax check identifying internetwork operating system commands that are not synchronized between the internetwork operating systems;
generating a Mismatched Command List (MCL) having entries for each of the identified internetwork operating system commands; and
completing the requested asymmetric in-service software upgrade according to an analysis of the MCL, wherein said first processor and said second processor are configured to operate in a Stateful SwitchOver mode of operation, wherein said first processor is configured to be an Active processor and said second processor is configured to be a Standby processor, and wherein if said MCL is not empty, said Standby processor is prevented from reaching a hot-standby state.

10. The computer-usable medium of claim 9, wherein the computer-readable program code, if executed, results in:
if there are no identified internetwork operating system commands, completing the requested asymmetric in-service software upgrade.

11. The computer-usable medium of claim 10, wherein the computer-readable program code, if executed, results in:
creating a Mismatch Ignore List (MIL), comprising a subset of the plurality of configuration commands which can be unsynchronized between the internetwork operating systems.

12. The computer-usable medium of claim 11, wherein the computer-readable program code, if executed, results in:
checking the identified internetwork operating system commands against said MIL; and
if every identified internetwork operating system command appears on said MIL, completing the asymmetric in-service software upgrade.

13. The computer-usable medium of claim 10, wherein the computer-readable program code, if executed, results in:
creating a "Don't Care to Sync List" (DCSL), comprising a subset of the plurality of configuration commands that should not be executed on said second processor.

14. The computer-usable medium of claim 13, wherein the computer-readable program code, if executed, results in:
checking the identified internetwork operating system commands against said DCSL; and
if every identified internetwork operating system command appears on said DCSL, completing the asymmetric in-service software upgrade.

15. A multiprocessor computing device, comprising:
a first means for processing data, wherein said first means for processing data is configured to execute a first software controlling means;
a second means for processing data, wherein said second means for processing data is configured to execute a second software controlling means;
a means for transmitting information between said first means for processing data and said second means for processing data; and
a means for receiving data;
wherein said first means for processing data determines a current configuration state of said first means for processing data, said second means for processing data performs a syntax check of each of a plurality of configuration commands associated with said current configuration state, and for each of said plurality of configuration commands that fails said syntax check, said second means for processing data creates an entry on a Mismatched Command List (MCL); and
wherein said first means for processing data and said second means for processing data are configured to operate in a Stateful SwitchOver mode of operation, wherein said first means for processing data is configured to be an Active processor and said second means for processing data is configured to be a Standby processor, and wherein if said MCL is not empty, said Standby processor is prevented from reaching a hot-standby state.

* * * * *

UNITED STATES PATENT AND TRADEMARK OFFICE
CERTIFICATE OF CORRECTION

PATENT NO.       : 7,661,025 B2
APPLICATION NO.  : 11/336167
DATED            : February 9, 2010
INVENTOR(S)      : Banks et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this

Fourth Day of January, 2011

David J. Kappos
*Director of the United States Patent and Trademark Office*